United States Patent
Inanami et al.

(10) Patent No.: US 8,468,480 B2
(45) Date of Patent: Jun. 18, 2013

(54) METHOD OF DESIGNING A TEMPLATE PATTERN, METHOD OF MANUFACTURING A TEMPLATE AND METHOD OF MANUFACTURING A SEMICONDUCTOR DEVICE

(75) Inventors: Ryoichi Inanami, Yokohama (JP); Hiroshi Tokue, Yokohama (JP); Ikuo Yoneda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 587 days.

(21) Appl. No.: 12/725,202

(22) Filed: Mar. 16, 2010

(65) Prior Publication Data
US 2010/0237540 A1   Sep. 23, 2010

(30) Foreign Application Priority Data
Mar. 19, 2009 (JP) .................................. 2009-068961

(51) Int. Cl.
*G06F 17/50* (2006.01)
(52) U.S. Cl.
USPC ......................................................... 716/110
(58) Field of Classification Search
USPC ................................ 716/100, 110
See application file for complete search history.

(56) References Cited

U.S. PATENT DOCUMENTS

| 2002/0157076 A1* | 10/2002 | Asakawa ........................ 716/10 |
| 2006/0230959 A1 | 10/2006 | Meijer et al. |
| 2008/0090170 A1 | 4/2008 | Yoneda |
| 2008/0258201 A1* | 10/2008 | Baba et al. ..................... 257/316 |
| 2009/0045539 A1 | 2/2009 | Yoneda |
| 2009/0276745 A1* | 11/2009 | Nitta ................................. 716/6 |
| 2010/0021848 A1* | 1/2010 | Yoneda et al. ................ 430/311 |
| 2011/0068436 A1* | 3/2011 | Culp et al. ..................... 257/620 |

FOREIGN PATENT DOCUMENTS

| JP | 2006-303503 | 11/2006 |
| JP | 2008-91782 | 4/2008 |

* cited by examiner

*Primary Examiner* — Suchin Parihar
(74) *Attorney, Agent, or Firm* — Finnegan, Henderson, Farabow, Garrett & Dunner, LLP (57) ABSTRACT

A method of designing a template pattern used for imprint lithography, includes generating data of a dummy template pattern to be formed in a third area between first and second areas of a template based on data of a design pattern of the template, the data of the dummy template pattern being generated so that a third surface area ratio showing a ratio of a surface area of the third area to an area of the third area is set smaller than a first surface area ratio showing a ratio of a surface area of the first area to an area of the first area and larger than a second surface area ratio showing a ratio of a surface area of the second area to an area of the second area.

13 Claims, 10 Drawing Sheets

F I G. 22

METHOD OF DESIGNING A TEMPLATE PATTERN, METHOD OF MANUFACTURING A TEMPLATE AND METHOD OF MANUFACTURING A SEMICONDUCTOR DEVICE

CROSS-REFERENCE TO RELATED APPLICATIONS

This application is based upon and claims the benefit of priority from prior Japanese Patent Application No. 2009-068961, filed Mar. 19, 2009, the entire contents of which are incorporated herein by reference.

BACKGROUND OF THE INVENTION

1. Field of the Invention

The present invention relates to a method of designing a template pattern, a method of manufacturing a template and a method of manufacturing a semiconductor device.

2. Description of the Related Art

Imprint lithography is proposed as a pattern transfer technique in a process of manufacturing a semiconductor device (e.g., see Jpn. Pat. Appln. KOKAI Publication No. 2006-303503). According to the imprint lithography, a template (mold) having a device pattern is in contact with an imprint material layer such as a resist so that the device pattern is transferred to the imprint material layer.

However, the imprint lithography has the following problem. Specifically, when a template is separated from an imprint material layer, a defect is generated in a pattern of the imprint material layer.

BRIEF SUMMARY OF THE INVENTION

According to a first aspect of the present invention, there is provided a method of designing a template pattern used for imprint lithography, comprising: generating data of a dummy template pattern to be formed in a third area between first and second areas of a template based on data of a design pattern of the template, the data of the dummy template pattern being generated so that a third surface area ratio showing a ratio of a surface area of the third area to an area of the third area is set smaller than a first surface area ratio showing a ratio of a surface area of the first area to an area of the first area and larger than a second surface area ratio showing a ratio of a surface area of the second area to an area of the second area.

According to a second aspect of the present invention, there is provided a method of manufacturing a template, comprising: forming a template pattern designed using the above method in a template substrate.

According to a third aspect of the present invention, there is provided a method of manufacturing a semiconductor device, comprising: transferring a pattern formed in the template manufactured using the above method to an imprint material layer on a substrate.

DETAILED DESCRIPTION OF THE INVENTION

An embodiment of the present invention will be hereinafter described with reference to the accompanying drawings.

Knowledge obtained by inventors will be first explained below prior to the detailed explanation of an embodiment.

As already described, there is a problem that a defect is generated in a resist pattern when a template is separated from a resist layer (imprint material layer). Specifically, when a template is separated, a part of a resist pattern is torn off by the template, and as a result, the torn-off resist remains in a recess portion of a template pattern. The generation of the foregoing defect is a big factor of reducing the yield in imprint lithography.

Figure 1:
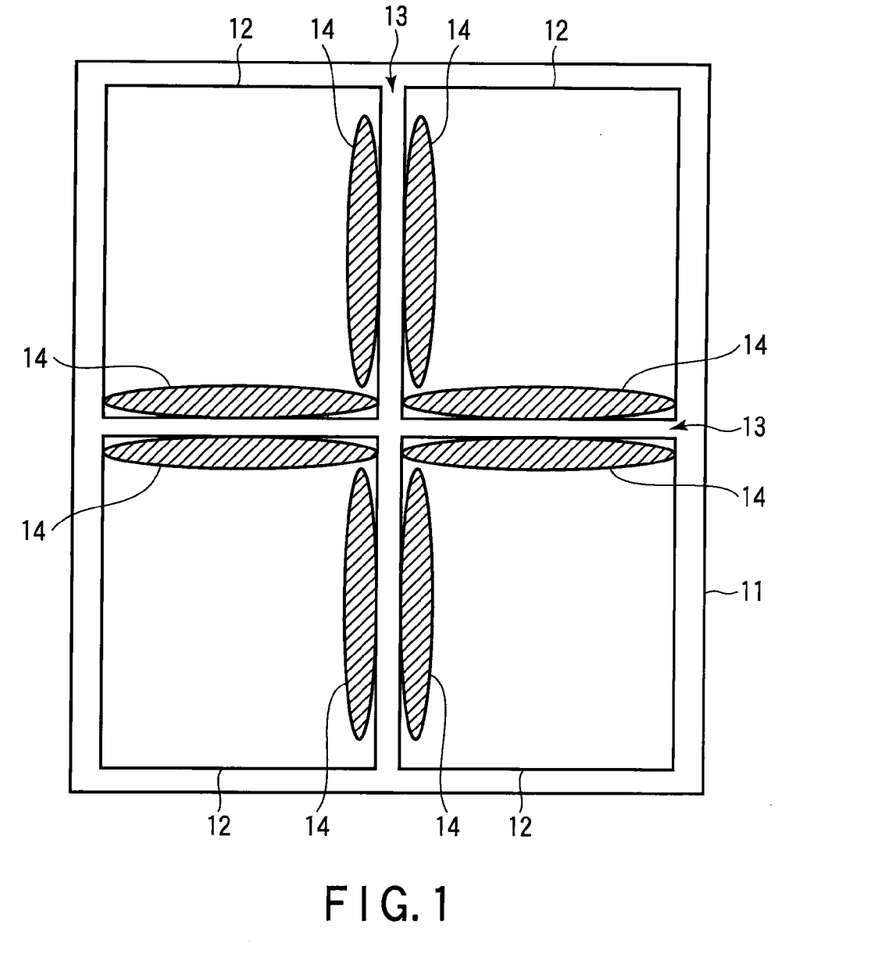
FIG. 1 is a view schematically showing a defect generated area.

Inventors have detailedly investigated the foregoing defect generated portion. As a result, it can be found that a defect is generated in a specified area. FIG. 1 is a view schematically showing a defect generated area.

In FIG. 1, a reference numeral 11 denotes a one-shot area, that is, an area where an imprint pattern is transferred by one-time imprint operation of one template. A reference numeral 12 denotes a chip area, that is, an LSI chip pattern formation area. Usually, the chip area 12 is provided with a high-density LSI pattern. A reference numeral 13 denotes an interchip area corresponding to a dicing area. A reference numeral 14 denotes the foregoing defect generated area.

As shown in FIG. 1, it can be seen that the defect generated area 14 collectively distributes near the end portions of the chip area. Hereinafter, the generation mechanism of the foregoing defect will be described.

FIGS. 2 to 6 are views schematically showing a separation operation in imprint. The generation mechanism of the defect will be explained below with reference to FIGS. 2 to 6.

Figure 2:
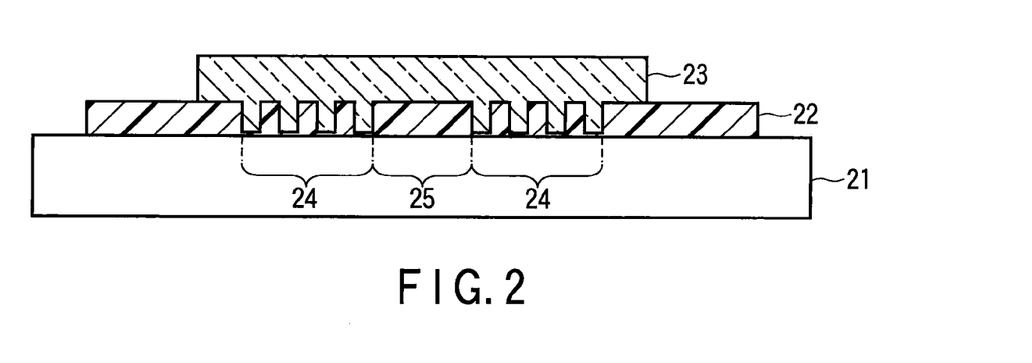
FIG. 2 is a view schematically showing one process of a separation operation in imprint.

As shown in FIG. 2, a template 23 is in contact with a resist layer (imprint material layer) 22 on a substrate (wafer) 21. Thereafter, light (ultraviolet (UV) light) is irradiated to the resist layer 22 or the resist layer 22 is heated so that the resist layer 22 is hardened. In this way, a template pattern formed in the template 23 is transferred to the resist layer 22. In FIG. 2, a reference numeral 24 denotes a chip area, and 25 denotes an interchip area.

Figure 3:
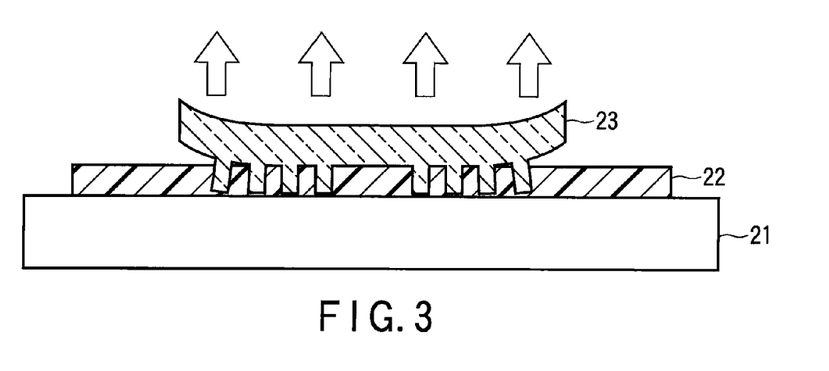
FIG. 3 is a view schematically showing one process of a separation operation in imprint.

As illustrated in FIG. 3, the template 23 is left up so that a separation operation is started. A contact area of a pattern formed surface of the template 23 with the resist layer 22 is very large; for this reason, a considerably strong adhesion force acts between the template 23 and the resist layer 22. Resulting from the foregoing factor, a separation operation of the template 23 is started from a place easy to peel off. Specifically, as can be seen from FIG. 3, the separation operation is started from the end portion of the template 23. For this reason, the end portion of the template 23 is warped. Moreover, the substrate 21 is warped in the vicinity of the end portion of the template 23. Hereinafter, an explanation will be made considering the case where the end portion of the template 23 is warped.

Figure 4:
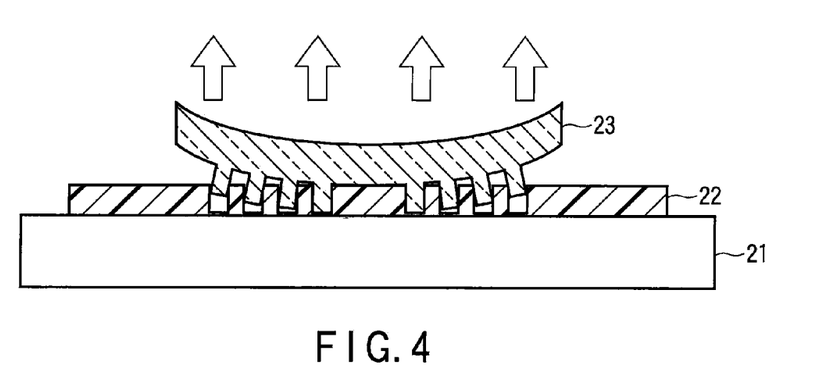
FIG. 4 is a view schematically showing one process of a separation operation in imprint.

As depicted in FIG. 4, when the template 23 is further left up by a fixed force, the separation operation shifts from the end portion of the template 23 toward the center portion thereof. Therefore, the warp of the template 23 proceeds from the end portion toward the center portion.

Figure 5:
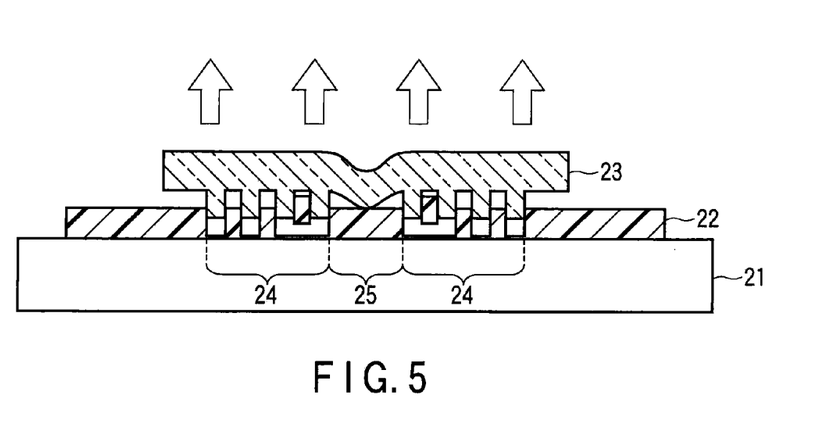
FIG. 5 is a view schematically showing one process of a separation operation in imprint.
Figure 6:
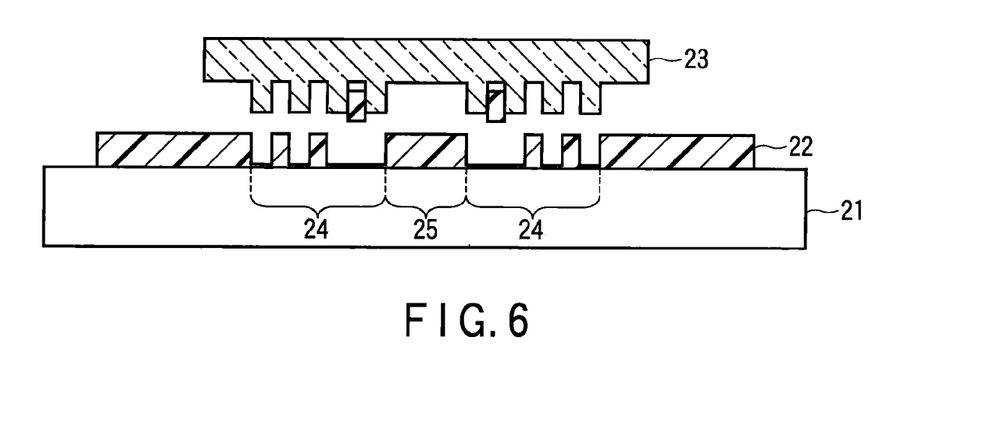
FIG. 6 is a view schematically showing one process of a separation operation in imprint.

As seen from FIG. 5, when the template 23 is further left up, a separation operation of the center portion, that is, the interchip area 25 is started. Micro-patterns do not exist in the interchip area 25; for this reason, a contact area of the template 23 with the resist layer 22 is small. As a result, a force required for separating the template becomes small. For this reason, when the template 23 is left up by the same force, a separation velocity rapidly increases. As a result, micro-patterns in the vicinity of the interchip area 25 are torn off by means of the template 23. As shown in FIG. 6, the template 23 is separated in a state that the torn-off resist portion is filled in a recess portion of the template 23.

When the foregoing problem arises, a defect is generated in a part of a resist pattern. Moreover, the next pattern transfer is carried out in the foregoing state that the torn-off portion is filled in a recess portion of the template 23. As a result, a normal pattern is not transferred, and as a result, a defect is generated in a part of the resist pattern.

Figure 7:
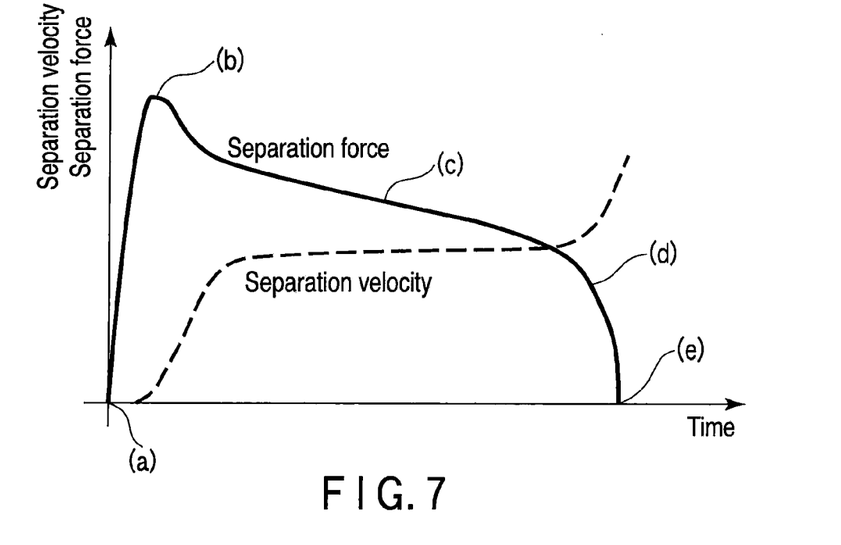
FIG. 7 is a graph showing a change of a separation force and a separation velocity in a separation operation.

FIG. 7 is a graph to explain a change according to a condition of a separation force and a separation velocity in the separation operation shown in FIGS. 2 to 6. Symbols (a) to (e) shown in FIG. 7 correspond to FIGS. 2 to 6, respectively. At time of (d) in FIG. 7, the separation force is rapidly reduced while the separation velocity rapidly increases. As a result, micro-resist patterns in the vicinity of the interchip area 25 are torn off. Therefore, it is important to prevent a rapid change of the separation velocity.

Hereinafter, an embodiment of the present invention will be detailedly described.

Figure 8:
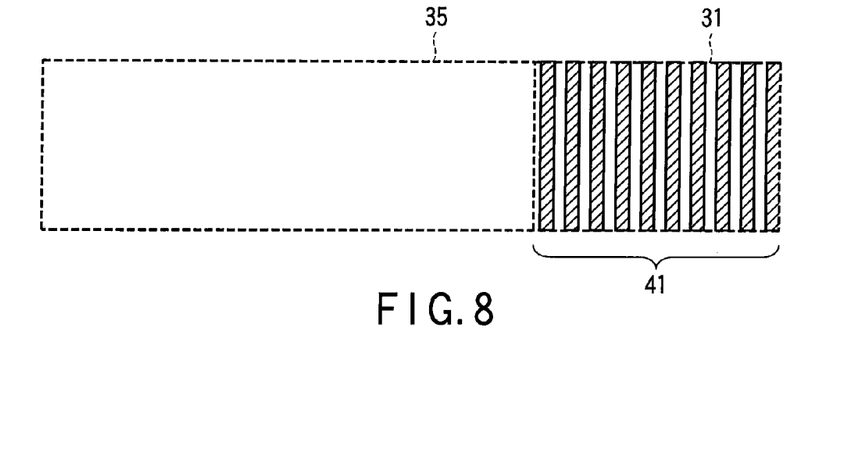
FIG. 8 is a view to explain the basic principle of an embodiment of the present invention.
Figure 9:
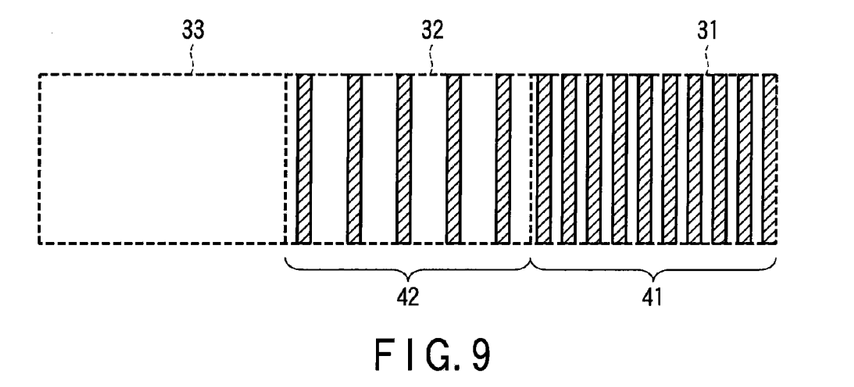
FIG. 9 is a view to explain the basic principle of an embodiment of the present invention.
Figure 10:
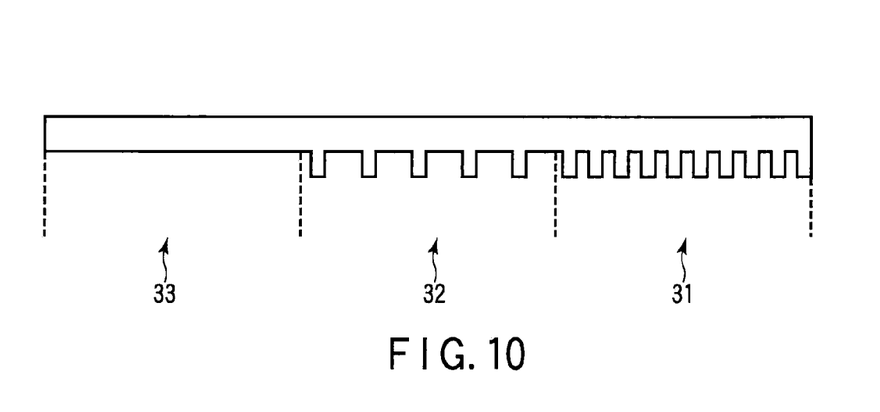
FIG. 10 is a view to explain the basic principle of an embodiment of the present invention.

FIGS. 8 to 10 are views to explain the basic principle of this embodiment.

FIG. 8 is a view showing a normal template pattern when a template is manufactured based on design data of a pattern (including circuit pattern and mark pattern) to be formed in a semiconductor device. In FIG. 8, an area 35 having no pattern is provided adjacent to an area 31 having a dense pattern 41. For example, the area 31 is included in the chip area, and the area 35 is included in the interchip area. In this case, the dense pattern exists in the area 31; therefore, a contact area of a template with a resist layer is very large. Conversely, the area 35 has no pattern; for this reason, a contact area of a template with a resist layer is small. Therefore, when the template is separated from the resist layer, a separation velocity rapidly increases when a separation area shifts from the area 31 to the area 35. For this reason, there is the possibility that a resist pattern is torn off at the end portion of the area 31.

In order to solve the foregoing problem, according to this embodiment, as shown in FIGS. 9 (plan view) and 10 (cross-sectional view), the area 32 neighboring the area 31 is provided with a dummy template pattern 42. Specifically, an area 32 between the area 31 having the dense pattern 41 and the area 33 having no pattern is provided with a dummy template pattern 42. In this way, it is possible to prevent the foregoing problem. Hereinafter, the explanation will be further made.

A contact area of a template with a resist layer is very large in the area 31 while the contact area of a template with a resist layer is small in the area 35. For this reason, when a separation area shifts from the area 31 to the area 35, a separation velocity rapidly increases. Therefore, there is a problem that a contact area rapidly decreases; in other word, there is a problem that a surface area of a template rapidly decreases.

Thus, according to this embodiment, the area 32 adjacent to the area 31 is provided with a dummy template pattern 42 to prevent the surface area of template from rapidly decreasing. Specifically, a ratio of the surface area of the area 32 to an area of the area 32 of the template is set smaller than a ratio of the surface area of the area 31 to an area of the area 31. In addition, a ratio of the surface area of the area 32 to the area of the area 32 is set larger than a ratio of the surface area of the area 33 to the area of the area 33. According to this embodiment, a ratio of the surface area of an area A of a template to the area of the area A is called as a surface area ratio. As described above, the dummy template pattern 42 is provided, and thereby, according to the case of FIG. 9, a change of the surface area ratio is smaller than the case of FIG. 8.

In this case, the area of the area A means a two-dimensional area (plane area) of the area A, that is, a two-dimensional area (plane area) of a pattern formation surface of a template. The surface area of the area A corresponds to a contact area of a template with a resist layer, and an area of the side of a template pattern is considered. Namely, the surface area of the area A comes into the total area of the area of the area A and an area of the side of a template pattern formed in the area A. For example, the area of the area A is set as S, the peripheral length of a template pattern formed in the area A is set as L and the depth (height) of a template pattern formed in the area A is set as D. In this case, the surface area of the template pattern formed in the area A is obtained from the following equation.

$$\text{"Surface area} = S + L \times D\text{"}$$

The dummy template pattern is generated at design stage before a template is actually prepared and arranged at a placement area of a dummy template pattern.

According to the foregoing embodiment, areas 33 and 35 have no pattern. However, a pattern may be formed in areas 33 and 35 so long as the foregoing relationship is established between the surface area ratios of areas 31, 32 and 33. If a large pattern exists in the placement area of the dummy template pattern, the large pattern may be divided so that a dummy template pattern is generated.

As described above, the area 32 provided with a dummy template pattern is interposed between the area 31 having a large surface area ratio and the area 33 having a small surface area ratio. In this way, the surface area ratio of the area 32 is set to a value ranging between the surface area ratio of the area 31 and that of the area 33. In the manner described above, each surface area ratio of areas 31, 32 and 33 is set, and thereby, this serves to prevent a rapid change of a surface area ratio, and to prevent a rapid change of a contact area of a template with a resist layer. Therefore, it is possible to prevent a separation velocity from rapidly increasing, and to prevent a resist pattern from being torn off.

Figure 11:
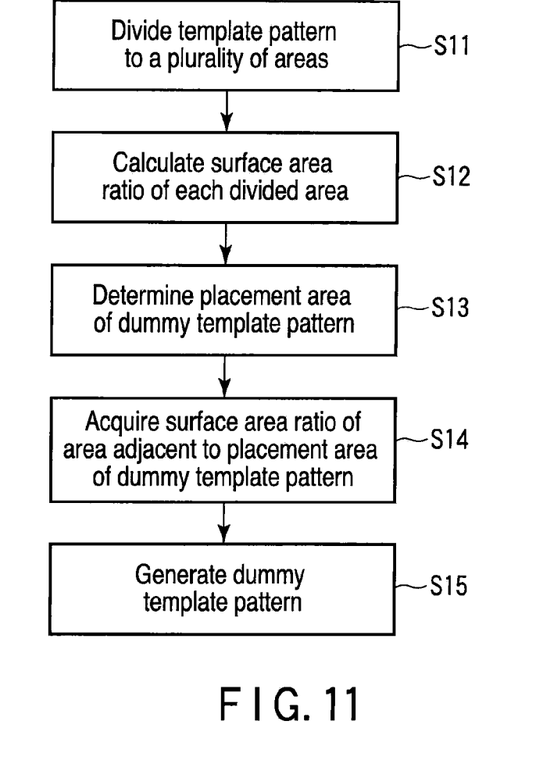
FIG. 11 is a flowchart to explain a method of designing a template pattern according to an embodiment of the present invention.

Hereinafter, a method of designing the foregoing template pattern will be described with reference to a flowchart shown in FIG. 11.

First, a template pattern is generated based on the design pattern data of a semiconductor device. Thereafter, the generated template pattern is divided into a plurality of mesh-shaped areas (S11).

A surface area ratio of each divided area is calculated, and then, a surface area ratio map is prepared (S12).

Based on the foregoing surface area ratio map, an area of arranging a dummy template pattern is determined (S13). Specifically, a divided area having a rapidly decreased surface area ratio with respect to neighboring divided area is obtained, and then, the foregoing divided area is determined as a placement area of a dummy template pattern.

A surface area ratio of each divided area adjacent to both sides of the placement area of a dummy template pattern is calculated based on the design pattern data (S14).

A dummy template pattern to be arranged in the dummy template pattern placement area is generated (S15). Specifically, based on the surface area ratios of both neighboring divided areas calculated in step S14, a dummy template pattern is generated so that a surface area ratio of the dummy template pattern placement area is set to a value ranging between the surface area ratios of both neighboring divided areas.

According to this embodiment, a third area between a first area having a large surface area ratio (first surface area ratio) and a second area having a small surface area ratio (second surface area ratio) is provided with a dummy template pattern. In this way, a surface area ratio (third surface area ratio) of the third area is set smaller than the first surface area ratio and larger than the second surface area ratio. This serves to prevent a rapid change of a surface area ratio, and to prevent a rapid change of a contact area of a template with a resist layer. Therefore, it is possible to prevent a rapid increase of a separation velocity, and to effectively prevent a resist pattern from being torn off. As a result, the generation of a defect can be prevented in the resist pattern.

Various changes may be made with respect to the dummy template pattern. Hereinafter, various modifications will be described.

Figure 12:
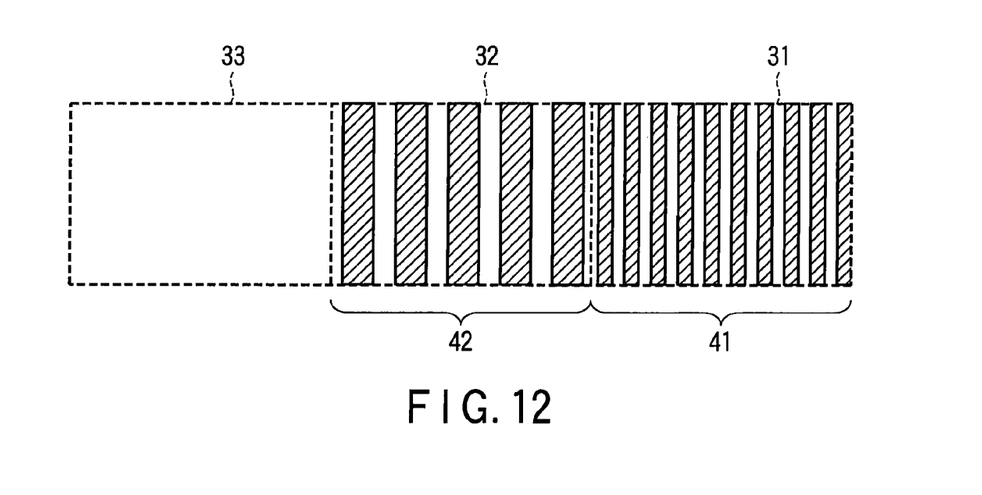
FIG. 12 is a view schematically showing a first modification example of an embodiment of the present invention.

FIG. 12 is a view schematically showing a first modification example. According to the embodiment shown in FIGS. 9 and 10, the area 32 is provided with the dummy template pattern 42 having a pitch larger than the template pattern 41 of the area 31. In this way, the number of patterns of the area 32 is relatively reduced, and the surface area ratio of the area 32 is set smaller than that of the area 31. According to this modification example, an area 32 is provided with a dummy template pattern 42 having a size (pattern width) larger than a template pattern 41 of an area 31. In this way, the number of patterns of the area 32 is relatively reduced, and the surface area ratio of the area 32 is set smaller than that of the area 31. Therefore, according to this modification example, the same effect as described above is obtained.

Figure 13:
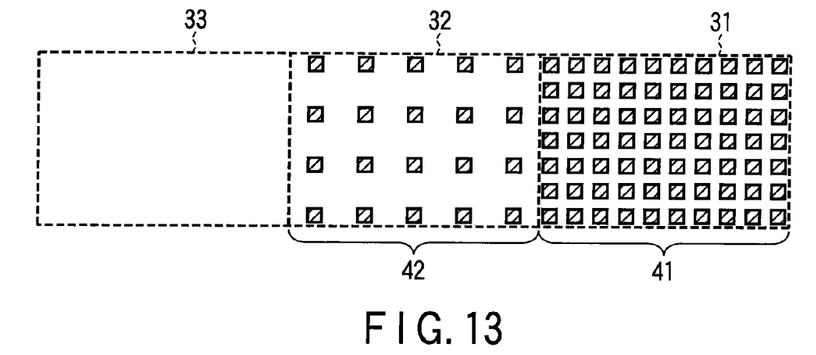
FIG. 13 is a view schematically showing a second modification example of an embodiment of the present invention.

FIG. 13 is a view schematically showing a second modification example. According to the embodiment shown in FIGS. 9 and 10, the template pattern 41 of the area 31 is a line-shaped pattern, and the dummy template pattern 42 of the area 32 is a line-shaped pattern. According to the second modification example, a template pattern 41 of an area 31 is a square-shaped pattern, and also, a dummy template pattern 42 of an area 32 is a square-shaped pattern. According to this modification example, the area 32 is provided with a dummy template pattern 42 having a pitch larger than the template pattern 41 of the area 31. In this way, the number of patterns of the area 32 is relatively reduced, and the surface area ratio of the area 32 is set smaller than that of the area 31. Therefore, according to this modification example, the same effect as described above is obtained.

Figure 14:
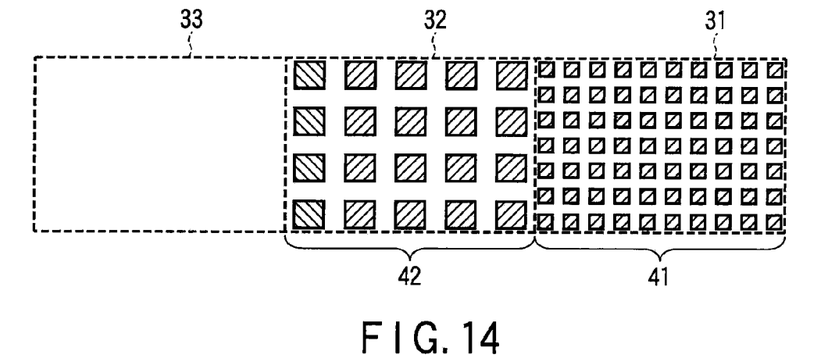
FIG. 14 is a view schematically showing a third modification example of an embodiment of the present invention.

FIG. 14 is a view schematically showing a third modification example. According to the third modification example, a dummy template pattern 42 of an area 32 is a square-shaped pattern as well as the second modification example. According to this modification example, the area 32 is provided with a dummy template pattern 42 having a size larger than a template pattern 41 of an area 31. In this way, the number of patterns of the area 32 is relatively reduced, and a surface area ratio of the area 32 is smaller than that of the area 31. Therefore, according to this modification example, the same effect described above is obtained.

Figure 15:
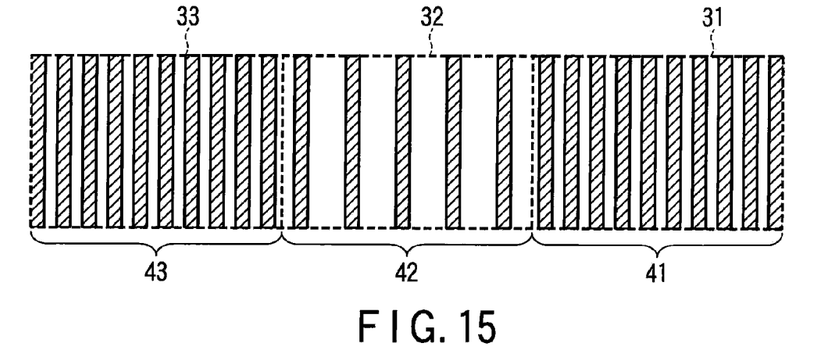
FIG. 15 is a view schematically showing a fourth modification example of an embodiment of the present invention.

FIG. 15 is a view schematically showing a fourth modification example. According to the embodiment shown in FIGS. 9 and 10, the surface area ratio of the template becomes small in the order of areas 31, 32 and 33. According to the fourth modification example, the surface area ratios of areas 31 and 33 are relatively large while the surface area ratio of the area 32 ranging between areas 31 and 33 is relatively small. Even if the foregoing configuration is employed, it is possible to prevent a defect from being generated in a resist pattern.

Figure 16:
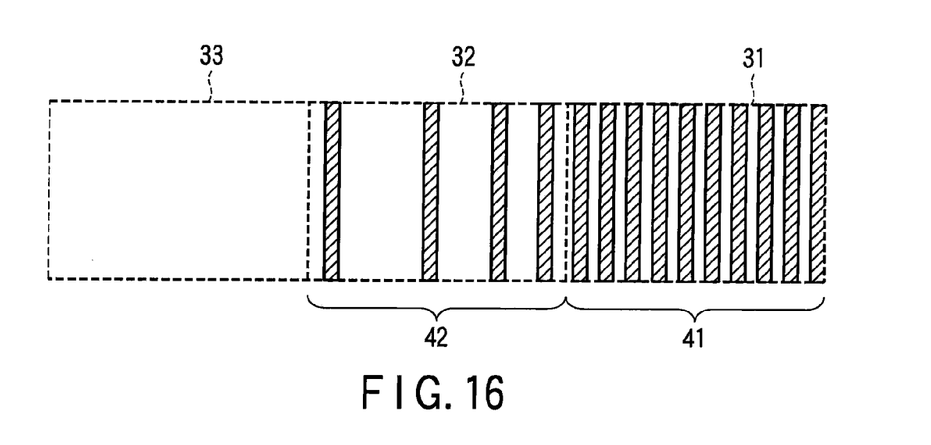
FIG. 16 is a view schematically showing a fifth modification example of an embodiment of the present invention.

FIG. 16 is a view schematically showing a fifth modification example. According to the embodiment shown in FIGS. 9 and 10, the surface area ratio of the area 32 provided with the dummy template pattern 42 is constant. According to the fifth modification example, the surface area ratio changes in the area 32. A change of the surface area ratio is given at least two stages or more. Specifically, the area 32 is divided into two sub-areas or more, and one sub-area relatively positioning on the side of the area 31 is set as a sub-area S1. Further, one sub-area (i.e., sub-area ranging between the area 33 and the sub-area S1) relatively positioning on the side of the area 33 is set as S2. In this case, a surface area ratio of the sub-area S1 is smaller than that of the area 31. A surface area ratio of the sub-area S2 is smaller than that of the area sub-area S1 and larger than that of the area 33. According to this example shown in FIG. 16, in the area 32, the surface area ratio gradually decreases from the area 31 toward the area 33. For example, preferably, a dummy template pattern 42 is provided so that a change of the surface area ratio is constant. According to this modification example, the same effect as described above is obtained. In addition, according to this example, the surface area ratio gradually changes in the area 32; therefore, this serves to further prevent a rapid change of a separation velocity.

Figure 17:
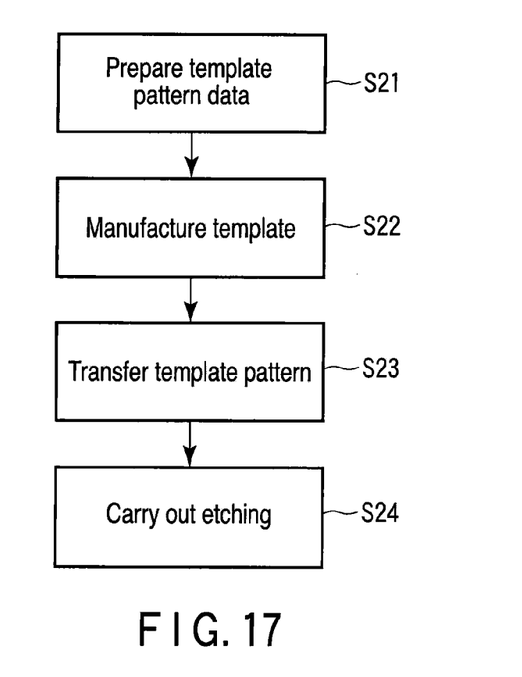
FIG. 17 is a flowchart to explain a method of manufacturing a template and a method of manufacturing a semiconductor device according to an embodiment of the present invention.

A method of manufacturing a template based on the template pattern designed according to the foregoing embodiments and a method of manufacturing a semiconductor device will be described below with reference to a flowchart shown in FIG. 17.

First, template pattern data designed according to the foregoing embodiments is prepared (S21). Based on the prepared template pattern data, the surface of a template substrate (quartz substrate) is formed with a template pattern by means of electron beam (EB) exposure and etching, and thus, a template is manufactured (S22). A semiconductor device (semiconductor integrated circuit device) is manufactured using the foregoing template thus manufactured. Specifically, the template pattern formed on the template is transferred to a resist layer (imprint material layer) on a substrate so that a resist pattern is formed (S23). Further, etching is carried out using the formed resist pattern as a mask so that a desired pattern is formed on a substrate (S24).

The foregoing method is employed, and thereby, it is possible to improve the manufacture yield of a semiconductor device. In other words, when the template pattern is transferred to the resist layer on the substrate, it is possible to prevent a defect from being generated in the resist pattern. Therefore, this contributes to improving the manufacture yield of a semiconductor device.

Moreover, the method of designing a template pattern described in the foregoing embodiment is realizable using a computer whose operation is controlled according to a program stored with the procedures of the foregoing method. The foregoing program is provided using a recoding medium such as a magnetic disk or a communication line (wire or wireless line) such as Internet.

The following is an explanation of the verification result (measurement result) when a pattern is actually formed on a substrate using the template obtained according to the method of the embodiment.

Figure 18:
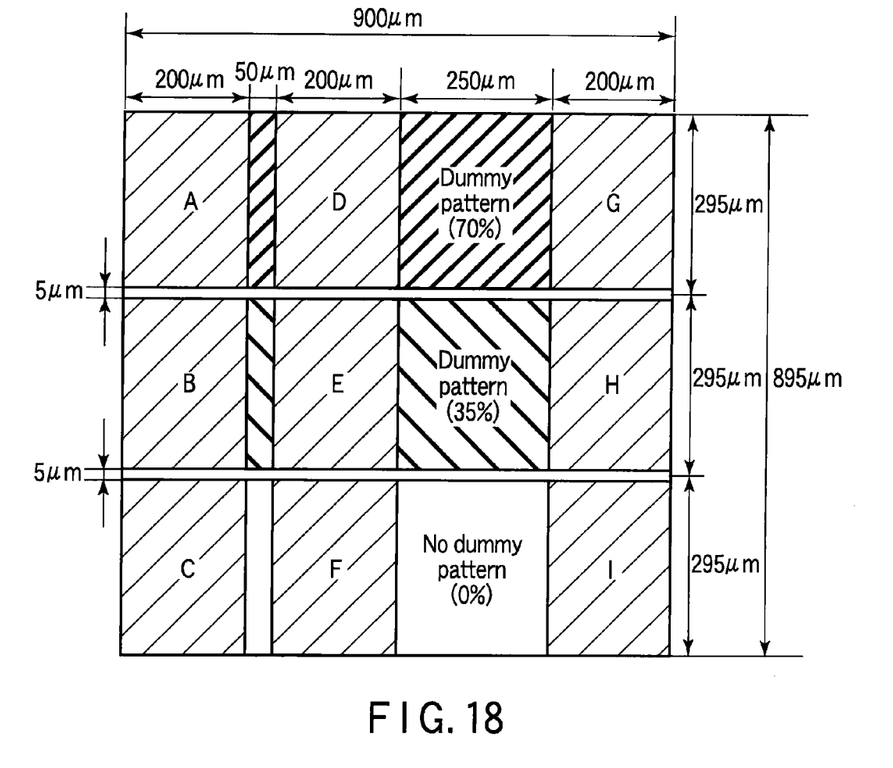
FIG. 18 is a view schematically showing a template pattern used for verifying the effect obtained according to the method of an embodiment of the present invention.
Figure 19:
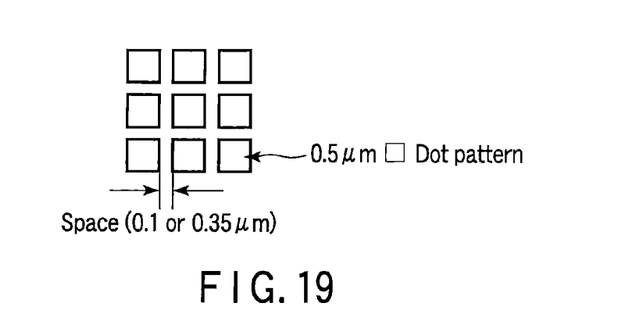
FIG. 19 is a view showing a dummy pattern formed in a template shown in FIG. 18.
Figure 20:
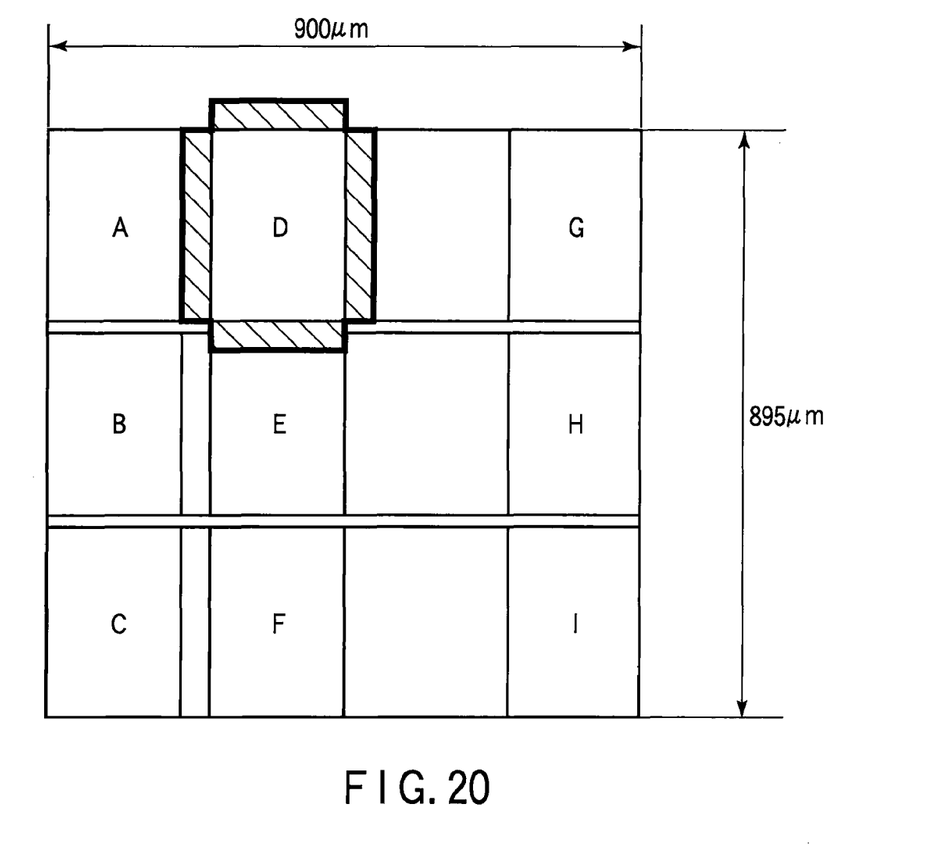
FIG. 20 is a view showing a calculation area of a peripheral pattern covering ratio with respect to an evaluation pattern formed in a template shown in FIG. 18.

FIG. 18 is a view showing a template used for verification. In the template, a line and space pattern (L/S pattern, half pitch=80 nm, line width:space width=L:S=1:1) is used as an evaluation pattern, and the L/S pattern is arranged on each of areas A to I. Further, a dot pattern shown in FIG. 19 is used as a dummy pattern. Specifically, three dummy patterns having pattern covering ratios (pattern occupation ration) 70%, 35% and 0% (no dummy pattern) are used. The relationship between a peripheral pattern covering ratio of an evaluation pattern (L/S pattern) and a defect density (DD) after a template is separated is investigated using the verification pattern. An average pattern covering ratio of areas having a width 50 µm shown by the slanted line of FIG. 20 was used as a peripheral pattern covering ratio of an evaluation pattern.

Figure 21:
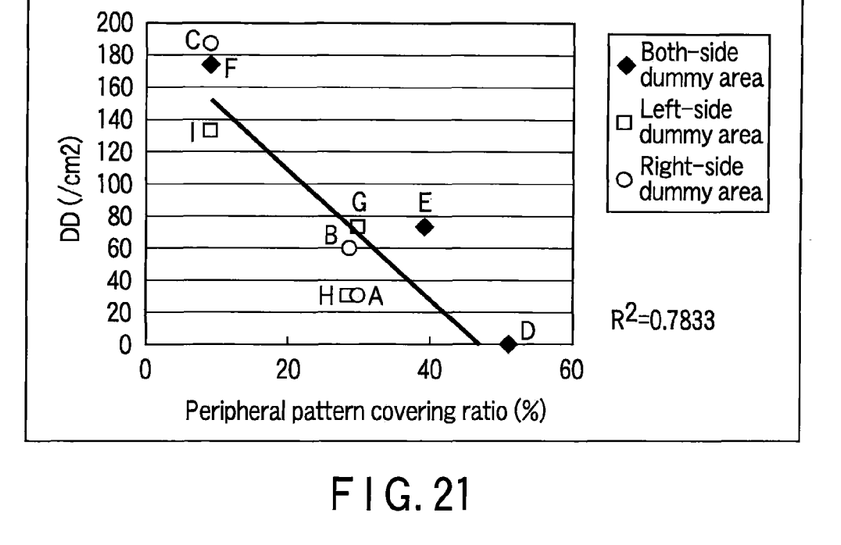
FIG. 21 is a graph to explain the relationship between a peripheral pattern covering ratio and a defect density in a template shown in FIG. 18.
Figure 22:
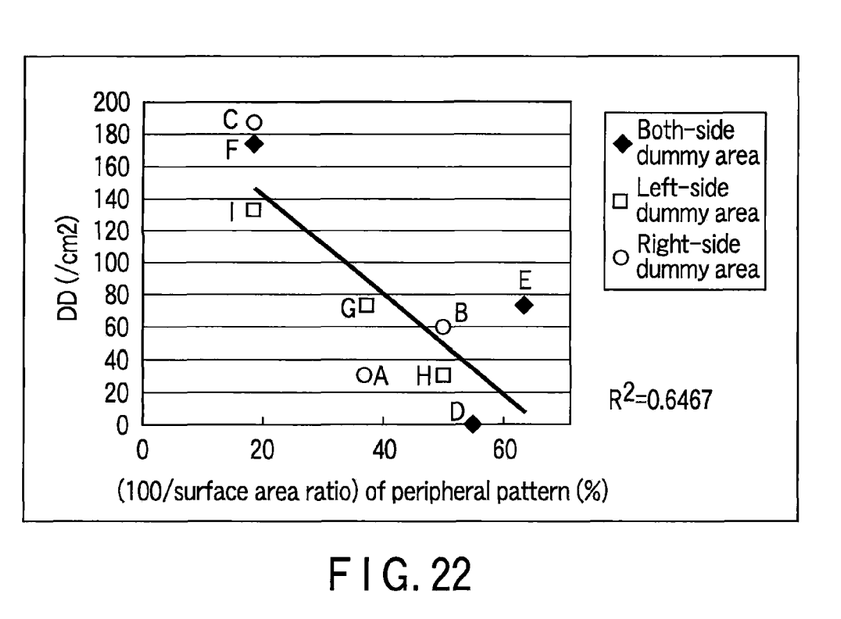
FIG. 22 is a graph to explain the relationship between a surface area ratio of a peripheral pattern and a defect density in a template shown in FIG. 18.

FIG. 21 is a graph showing the measured result. An approximate expression (straight line) was obtained from the measured result, and further, a peripheral pattern covering ratio to a defect density (DD) was calculated. As a result, a pattern covering ratio at DD=10/cm$^2$ was 44.6%, a pattern covering ratio at DD=1/cm$^2$ was 46.8%, and further, a pattern covering ratio at DD=0.1/cm$^2$ was 47.1%. Therefore, in order to obtain DD<1/cm$^2$, the pattern covering ratio must be set to about 47% or more. In other words, it is desirable that a peripheral pattern covering ratio is set to about 47% or more in order to obtain DD<1/cm$^2$ in an L/S pattern of L:S=1:1 (pattern covering ratio: 50%). FIG. 22 is a graph showing a value (100/surface area ratio (%)) expressed using the foregoing defined surface area ratio (surface area/area) as the horizontal axis.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer-implemented method of designing a template pattern used for imprint lithography, comprising:
   generating, by a computer, data of a dummy template pattern to be formed in a third area between first and second areas of a template based on data of a design pattern of the template,
   the data of the dummy template pattern being generated so that a third surface area ratio showing a ratio of a surface area of the third area to an area of the third area is set to be:
      smaller than a first surface area ratio showing a ratio of a surface area of the first area to an area of the first area, and
      larger than a second surface area ratio showing a ratio of a surface area of the second area to an area of the second area.

2. The method according to claim 1, wherein generating the data of the dummy template pattern includes:
   calculating the first surface area ratio based on the data of the design pattern;
   calculating the second surface area ratio based on the data of the design pattern; and
   generating the data of the dummy template pattern based on the first and second surface area ratios.

3. The method according to claim 1, wherein the first area is included in a chip area.

4. The method according to claim 1, wherein the second area is included in an interchip area.

5. The method according to claim 1, wherein the second area has no pattern.

6. The method according to claim 1, wherein a pitch of a dummy template pattern of the third area is larger than that of a template pattern of the first area.

7. The method according to claim 1, wherein a width of a dummy template pattern of the third area is larger than that of a template pattern of the first area.

8. The method according to claim 1, wherein the surface area ratio of the third area is constant.

9. The method according to claim 1, wherein the surface area ratio of the third area changes.

10. The method according to claim 1, wherein the third area includes a first sub-area and a second sub-area between the second area and the first sub-area, and
    a fourth surface area ratio showing a ratio of a surface area of the first sub-area to an area of the first sub-area is smaller than the first surface area ratio, and
    a fifth surface area ratio showing a ratio of a surface area of the second sub-area to an area of the second sub-area is smaller than the fourth surface area ratio, and larger than the second surface area ratio.

11. The method according to claim 1, wherein the surface area ratio of the third area decreases from the first area toward the second area.

12. A method of manufacturing a template, comprising:
    forming a template pattern designed using the method according to claim 1 in a template substrate.

13. A method of manufacturing a semiconductor device, comprising:
    transferring a pattern formed in the template manufactured using the method according to claim 12 to an imprint material layer on a substrate.

* * * * *